United States Patent [19]

Rasmussen

[11] Patent Number: 4,792,397
[45] Date of Patent: Dec. 20, 1988

[54] FILTER APPARATUS WITH SEALING COLLECTOR AND FLOW CONTROL ELEMENT

[75] Inventor: Harold O. Rasmussen, Bonita, Calif.

[73] Assignee: Harvard Corporation, Evansville, Wis.

[21] Appl. No.: 60,115

[22] Filed: Jun. 9, 1987

[51] Int. Cl.[4] ..................... B01D 25/02; B01D 29/48
[52] U.S. Cl. .................................. 210/314; 210/435; 210/488; 210/497.1; 55/492; 55/498
[58] Field of Search ............... 210/314, 346, 486, 488, 210/494.1, 497.1; 55/484, 492, 498, 520

[56] References Cited

U.S. PATENT DOCUMENTS

| | | | |
|---|---|---|---|
| 3,048,276 | 8/1962 | Darnell | 210/488 |
| 3,079,001 | 2/1963 | May | 210/488 |
| 4,017,400 | 4/1977 | Schade | 210/439 |
| 4,366,057 | 12/1982 | Bridges et al. | 210/437 |
| 4,579,657 | 4/1986 | Hood, Jr. | 210/314 |
| 4,668,393 | 5/1987 | Stone | 210/497.1 |
| 4,690,761 | 9/1987 | Orlans | 210/488 |

FOREIGN PATENT DOCUMENTS 1032086  5/1978  Canada .

OTHER PUBLICATIONS

Hydra-Supreme System, Hydra-Tech Hydraulics, Inc., 11165 Condor Ave., Fountain Valley, Calif. 92708.

*Primary Examiner*—Richard V. Fisher
*Assistant Examiner*—Wanda L. Millard
*Attorney, Agent, or Firm*—Lathrop & Clark

[57] ABSTRACT

An improved pressurized filter apparatus, which filters fluid axially through filter elements formed with wound layers of tissue, includes at least one fluid collector with at least one passageway for filtered fluid to flow from the adjacent filter elements inwardly into the centrally located flow path to the filter exit port. The passageways are formed by upraised ridges which space the filter element exit ends from the substantially flat portion of the collector. Annular ring portions project axially from the flat portion of the collector into the adjacent filter element exit ends to form a first seal which separates unfiltered fluid from filtered fluid. A rigid outer retention ring projects axially from the outer perimeter of the collector flat portion, and includes one inside surface for each adjacent filter element which abuts against the periphery of the adjacent filter element to form a second seal which further ensures separation of unfiltered fluid from filtered fluid. When filter elements are arranged so that the intake ends of two filter elements face each other, the filter apparatus also may include a directional flow control element which forms a third seal with each of the two filter element intake ends to prevent the unfiltered fluid from bypassing the filter elements by leaking into the centrally located flow path. The pressurized axially fluid filter apparatus also may include at least one substantially non-expandable sheath, each of which surrounds one collector and encloses the peripheries of the adjacent filter elements to thereby limit expansion of the filter elements due to water adsorption.

28 Claims, 3 Drawing Sheets

FILTER APPARATUS WITH SEALING COLLECTOR AND FLOW CONTROL ELEMENT

BACKGROUND OF THE INVENTION

1. Field of the Invention

The present invention relates to filters for fluids such as hydraulic oil, transformer oil and lubricating oil, and more particularly to a fluid filter having a fluid collector which prevents leakage of unfiltered fluid into the filtered fluid, a directional flow control element which prevents leakage of unfiltered fluid between two opposed pairs of filter elements into the centrally located flow path, and a sheath for preventing expansion of the filter elements due to water adsorption.

2. Description of the Prior Art

Fluid filters for removing dirt, common residue, abrasive particles, acid condensate, sludge and corrosive matter from fluid such as engine lubricating oil are well known in the art. These filters are usually packaged either as disposable cannisters, replaceable cartridges, or as containers for containing generally one or more filter elements which are formed with layers of tissue wound about an inner core. Inflow and outflow connections are provided at the container inlet and outlet ports. Fluid entering the container will flow freely to an intake end of each filter element where the fluid enters the filter element and then flows axially through each filter element in the interstices between the layers of filtered tissues so that the dirt and sludge is removed from the fluid by the tissue layers. The fluid exits the filter elements and is then directed by a fluid collector through passageways to a centrally located flow path which is connected to the outlet port.

Substantial compressive forces are exerted hydraulically on the tissue layers. These forces tend to compress and deform the filter elements, particularly at the end of each filter element where the filtered fluid exits into a collector. As disclosed in U.S. Pat. No. 4,017,400 to Schade, these collectors often have an annular portion which extends into the adjacent filter element ends to form a seal which separates the filtered fluid from the unfiltered fluid. Nevertheless, deformation of the filter element at its exit end may cause flow channels to form which then allow fluid to flow around the annular seal and thus entirely bypass the filter element. As a result, a significant amount of unfiltered fluid can pass around the deformed filter element without removal of contaminants.

A flexible, nonporous membrane has been placed in a sealing relation about the peripheries of the filter elements and around the collectors to prevent the fluid from entering the collector without first passing through at least one filter element. This flexible membrane is often formed from an elastic material such as neoprene. When water adsorption causes the filter elements to expand radially outwardly thereby greatly increasing the peripheries of the filter elements, the flexible membrane also expands and can eventually press against the inside wall of the filter container. Filter element replacement therefore becomes quite difficult because the membrane acts as a "brake" against the inside wall of the filtered container when the filter element is being removed.

Fluid collectors which are used for directing filtered fluid from the filter elements into the centrally located flow path often are utilized in combination with at least one screen which is placed between the collector and the adjacent filter element. The screen maintains the filter element in a spaced relation to the collector, so that a space is formed where filtered fluid is allowed to exit from the filter element into the collector. The hydraulic forces within the filter which deform the filter element often cause the tissue layers in the filter element to be pressed into the interstices of the screen, thereby partially inhibiting the flow of fluid from the filrer element into the collector. This may be particularly problematic in industrial applications where large fluid flows are often required.

Fluid filters sometimes have a plurality of filter elements which are arranged so that the intake ends of two filter elements face each other. These intake ends must be maintained in a spaced relation so that unfiltered fluid can enter both intake ends. Corrugated cardboard has been used to maintain the intake ends in such a spaced relation. The cardboard tends to restrict fluid flow into the filter element inlet ends while permitting unfiltered fluid to leak into the centrally located flow path. The unfiltered fluid often travels along between the filter element core and the centrally located flow path to receiving ports into the centrally located flow path, thereby entirely bypassing the filter element tissue layers.

Increasing costs for the disposal and replacement of lubricating, hydraulic and transformer fluids has created a need for a fluid filter which lengthens the effective life of these fluids by maintaining them in as clean a state as possible. It is therefore essential to prevent unfiltered fluid from bypassing the filter elements and contaminating the filtered fluid.

SUMMARY OF THE INVENTION

The present invention is summarized in that a pressurized axial flow filter apparatus for filtering fluids includes a container with an inlet and an outlet port, a centrally located flow path having at least one receiving port for receiving filtered fluid which is to be transported out of the container outlet port, at least one filter element which encircles the centrally located flow path and at least one fluid collector. Each filter element includes a cardboard inner core wound about with layers of tissue through which the fluid passes, and a periphery. Each fluid collector encircles the centrally located flow path adjacent the receiving ports and has at least one passageway for filtered fluid to flow from adjacent filter elements inwardly to the receiving ports. A fluid collector includes a substantially flat portion having two sides of which at least one faces a filter element exit end from which filtered fluid is received, an inner margin which defines a centrally disposed opening through which the centrally located flow path axially passes, and an outer perimeter. The collector also has upraised ridges which project axially from each side of the substantially flat portion which faces a filter element exit end to abut and hold the corresponding filter elements in spaced relation to the flat portion. Each fluid collector includes an annular ring portion which projects axially from the substantially flat portion on each side which faces a filter element exit end. The annular ring portion projects axially a greater distance than do the upraised ridges so that it extends into each adjacent filter element exit end between layers of tissue which are disposed inwardly a few layers from the filter element periphery, so that a first seal is formed by the annular ring portion with each adjacent filter element end, the first seal separating the filtered fluid from any unfiltered fluid. Additionally, the fluid collector includes a rigid outer retention ring which projects axially from the outer perimeter of the substantially flat portion on each side which faces a filter element exit end. The rigid outer retention ring includes one inside surface for each adjacent filter element, each inside surface abutting the adjacent filter element so that a second seal is formed which provides for further separation of the filtered fluid within the collector from the unfiltered fluid. The upraised ridges may be substantially concentric, and the ridges may have ridge ends which with the substantially flat portion define passageways for the fluid to flow from the filter elements to the centrally located flow path.

The pressurized axial flow fluid filter apparatus may also include at least one substantially non-expandable sheath, each which surrounds one collector and also surrounds and abuts the peripheries of the adjacent filter elements to limit expansion of the filter elements due to adsorption of water so that the filter elements are prevented from expanding to a point where they abut against the container and are therefore difficult to remove from the container.

A pressurized axial flow fluid filter apparatus which has at least two pairs of opposed filter elements may also include a directional flow control element. The directional flow control element is an annulus which includes a central structural portion which is disposed between pairs of opposed filter elements and encircles about the centrally located flow path, and two projecting portions which each project axially outwardly from the central structural portion into an adjacent intake end of a filter element between layers of filter tissue which are disposed outwardly a few layers of tissue from the filter element inner core which is adjacent the centrally located flow path. Each projecting portion forms a third seal with the corresponding filter element to prevent the leakage of unfiltered fluid into the centrally located flow path, and also to prevent the travel of unfiltered fluid between the filter element and the centrally located flow path into the receiving ports thereof.

A primary object of the invention is to provide a pressurized axial flow filter apparatus for filtering fluids which prevents substantially all cross contamination between filtered and unfiltered fluid, even in filters having a plurality of filter elements which are arranged so that the intake ends of two filter elements face each other.

A second object of the invention is to provide a pressurized axial flow filter apparatus for filtering fluids which is capable of allowing relatively high flows of fluid therethrough without permitting unfiltered fluid to bypass the filter elements, even in those filters having a plurality of filter elements which are arranged so that the intake ends of two filter elements face each other.

Another object of the invention is to provide a pressurized axial flow filter apparatus for filtering fluids which allows filtered fluid to pass from the filter elements into the collector passageways without inhibiting the flow of the fluid therebetween.

An additional object of the invention is to provide a pressurized axial flow filter apparatus for filtering fluids which limits the expansion of the filter elements due to water adsorption, which expansion would otherwise cause the removal of the filter elements from the filter container to be difficult.

A further object of the invention is provide a pressurized axial flow filter apparatus for filtering fluids which can be used to maintain large volumes of fluid in a clean condition.

Other objects, features and advantages of the invention will be apparent from the following detailed description taken in conjunction with the accompanying drawings wherein preferred embodiments of the invention have been selected for exemplification.

DESCRIPTION OF THE PREFERRED EMBODIMENT

Figure 1:
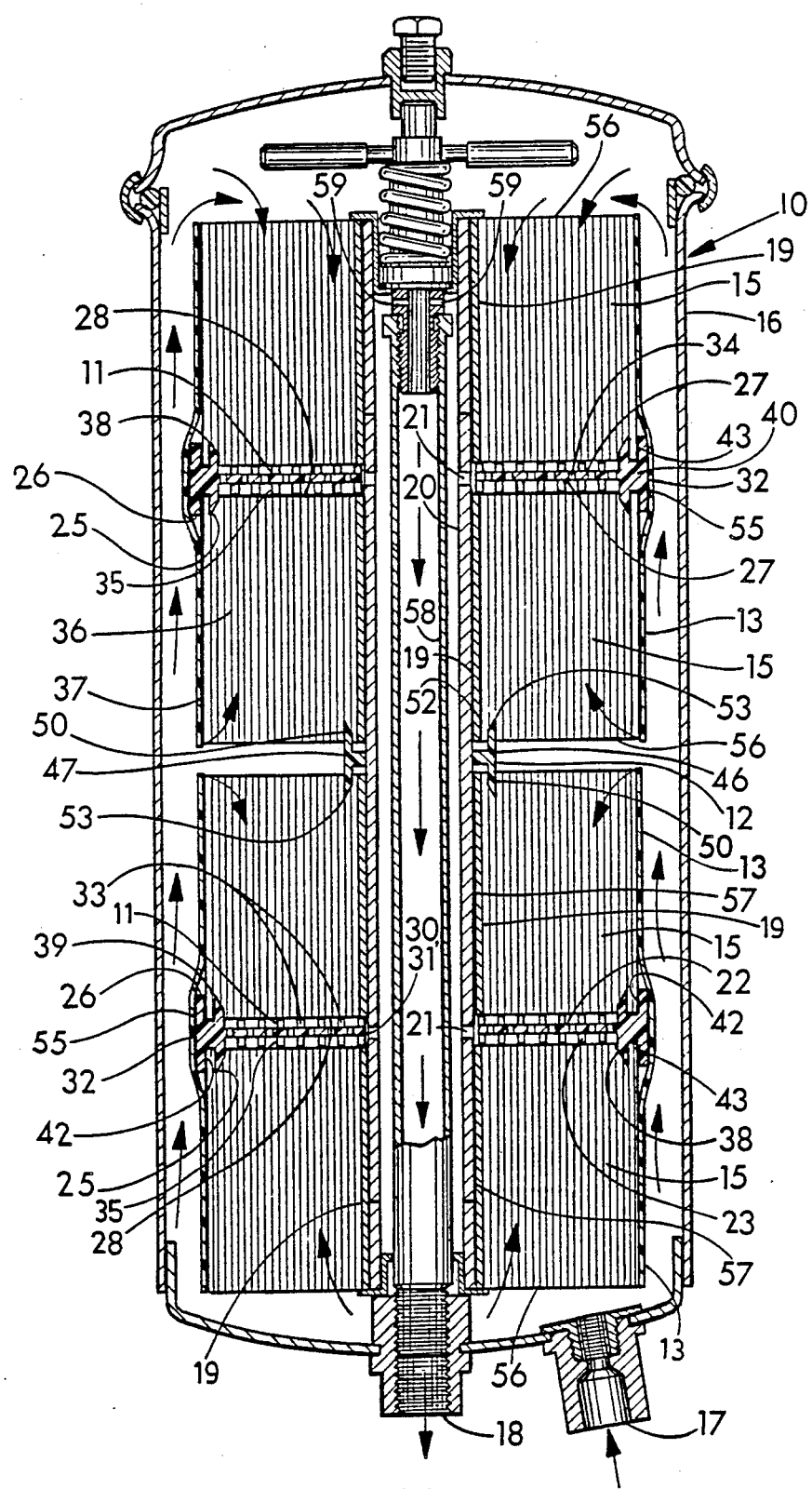
FIG. 1 is a cross-section view of a first preferred pressurized axial flow filter apparatus for filtering fluids, having two pairs of opposed filter elements.
Figure 2:
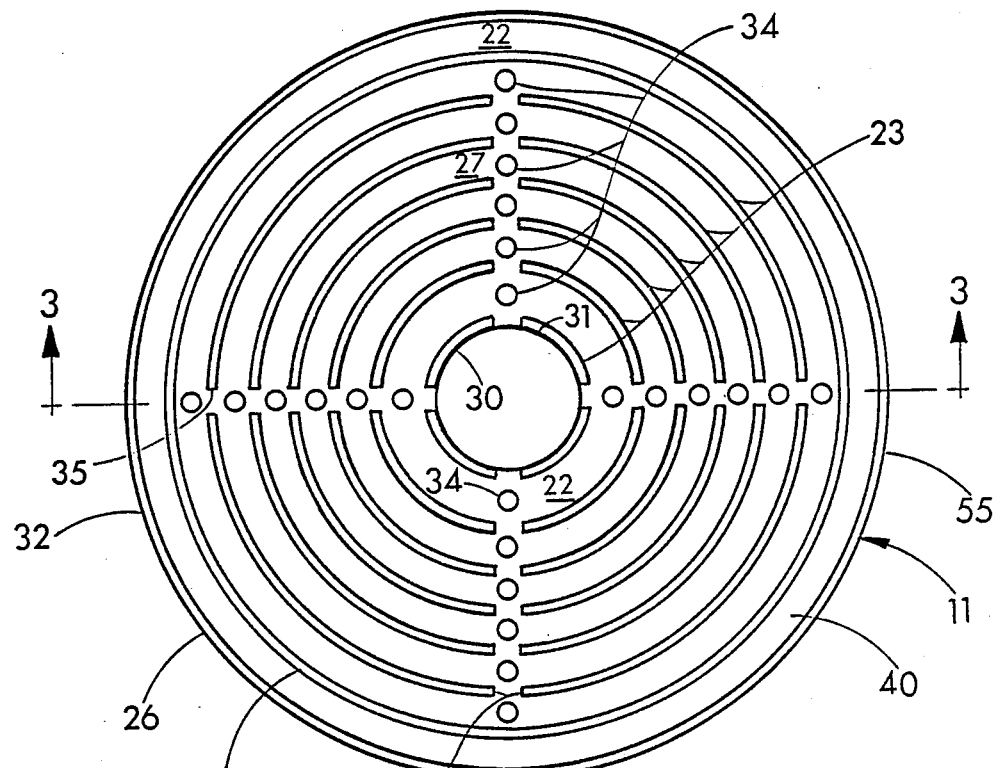
FIG. 2 is a top plan view of the filter collector used in the pressurized axial flow filter apparatus of FIG. 1.
Figure 3:
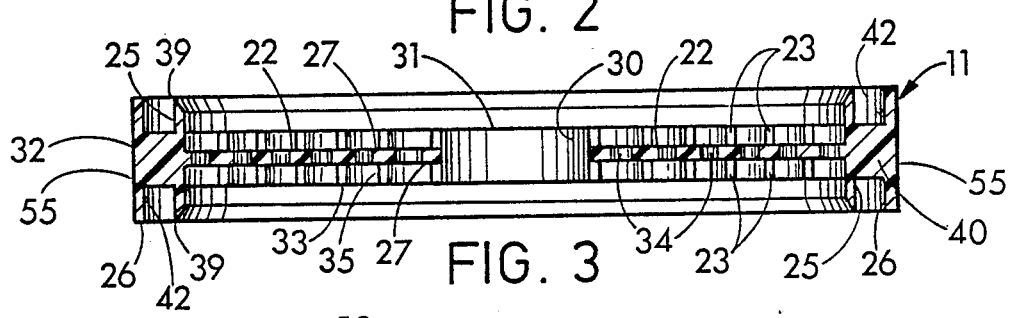
FIG. 3 is a cross-section view taken along section line 3—3 of FIG. 2.

Referring more particularly to the drawings, wherein like numbers refer to like parts, FIG. 1 shows a first preferred pressurized axial flow filter apparatus 10 having two fluid collectors 11, a directional flow control element 12, and two substantially non-expandable sheaths 13 each of which surrounds a pair of opposed filter elements 15 and the fluid collector 11 which is located between the two filter elements 15 of each pair. The filter apparatus 10 of FIG. 1 is comprised chiefly of a container 16 with an inlet port 17 and an outlet port 18, the filter elements 15, the two fluid collectors 11, and the centrally located flow path 20. Each filter element 15 is formed from layers of tissue 36 which are wound around a cylindrical cardboard inner core 19. As shown in FIGS. 2 and 3, the fluid collector 11 of the first preferred filter apparatus 10 encircles the centrally located flow path in a position which is adjacent to four receiving ports 21 for fluid entry into the centrally located flow path 20. The preferred fluid collector 11 shown in the drawings includes a substantially flat portion 22, forty-eight upraised ridges 23, annular ring portions 25 and a rigid outer retention ring 26. The substantially flat portion 22 of the fluid collector 11 has two sides 27, both of which face an adjacent filter element exit end 28 from which filtered fluid is received, an inner margin 30 which defines a centrally disposed opening 31 through which the centrally located flow path 20 passes, and an outer perimeter 32.

Twenty-four upraised ridges 23, arranged in six broken concentric circles of four upraised ridges 23 each, project axially from each side 27 of the substantially flat portion 22 to hold the adjacent filter element 15 in spaced relation to the substantially flat portion 22. Each upraised ridge 23 has two ridge ends 33. The ridge ends 33 of adjacent upraised ridges 23 in each concentric circle are arranged to define along with the substantially flat portion 22, four passageways 35 on each side 27 of the substantially flat portion 22 as shown in FIG.

2. The fluid collector 11 of the preferred filter apparatus 10 has a plurality of holes 34 extending through its substantially flat portion 22 between the two sides 27 to equalize fluid pressure on both sides 27 of the substantially flat portion 22. These holes 34 are preferably spaced equally along the substantially flat portion 22 where the substantially flat portion 22 with the ridge ends 33 define the passageways 35. Six holes 34 extend from each of the four passageways 35 on one side 27 to the corresponding four passageways 35 on the other side 27.

An annular ring portion 25 projects axially from each side 27 of the substantially flat portion 22 a greater axial distance than do the upraised ridges 23 so as to extend into the exit ends 28 of the two adjacent filter elements 15 between layers of tissue 36 in the filter elements 15 which are located inwardly a few layers 36 from a periphery 27 of each filter element 15. Since the filter element exit ends 28 rest on the upraised ridges 23 of the collector 11, the taller annular ring portion 25 is able to extend into each filter element end 28, so that a first seal 38 is formed by the annular ring portion 25 with each adjacent filter element end 28. This first seal 38 serves to separate the filtered fluid within the collector 11 from any unfiltered fluid. Each annular ring portion 25 is tapered to a sharp edge 39 where the annular ring portion 25 extends into a filter element end 28. These sharp edges 39 on the annular ring portions 25 allow the annular ring portions 25 to be pushed easily between the layers of filter element tissue 36 of the two adjacent filter elements 15 without significantly damaging the tissue 36.

The rigid outer retention ring 26 projects axially from both sides 27 of the substantially flat portion 22 at its outer perimeter 32, and includes two inside surfaces 42. Each inside surface 42 abuts against the periphery 37 of one of the two adjacent filter elements 15 to form a second seal 43. This second seal 43 serves to provide further separation of the filtered fluid within the collector 11 from any fluid which has yet passed through the filter elements 15. Between the annular ring portions 25 and the rigid outer retention ring 26, the substantially flat portion is thickened at 40 on both sides 27 an axial distance equal to the height of the upraised ridges. The fluid collector 11 shown in FIGS. 1-3 has two sides 27 which are each adapted to face a filter element 15 exit end 28. Alternatively, a collector might have only one side 27 which is so adapted. In such a case the ridges 23, the annular ring portion 25, and the rigid outer retention ring 26 might project axially from only one side 27 of the substantially flat portion 22.

The first preferred filter apparatus 10 also includes two substantially non-expandable sheaths 13, each of which surrounds and abuts the outer perimeter surface 55 of the rigid outer retention ring 26 of one fluid collector 11, and also the peripheries 37 of the two adjacent filter elements 15 which comprise a pair of opposed filter elements 15. The sheath 13 limits expansion of the filter elements 15 which occurs due to the adsorption of water to an outer limit which is defined by the outer perimeter surface 55 of the rigid outer retention ring 26. Without the sheath 13, the filter elements 15 could expand so as to actually press against the container 16, thereby causing a "braking action" between the filter element 15 and the wall of the container 16 which would make removal of the filter element from the container difficult. To facilitate removal of the filter elements 15 from the container 16, the sheath 13 prevents the filter elements 15 from expanding to the point where their periphery would abut against the inside of the container 16. The sheath 13 also enhances the separation between unfiltered and filtered fluid which is maintained by the first and second seals 38 and 43. The sheath 13 of the first preferred filter apparatus 10 is formed from a substantially rectangular, shrink-wrappable, heat-sealed plastic sheet which is dimensionally stable at the operating temperatures of the filter apparatus 10, which may vary from ambient to a high temperature of 275° F. For example, the sheath 13 may be formed from polyethylene terephthalate, more commonly known under the trademark "Mylar". The piece of plastic forming the sheath 13 is joined at its two ends (not shown) to form a seam. It is recommended that a two part epoxy glue, or a heat melt type glue be used to join together the two ends of the plastic sheath. The sheath 13 preferably should be heat sealed to the fluid collector rigid outer retention ring 26. If the fluid collector 11 has no rigid outer retention ring 26, the sheath 13 may be heat sealed to the outer perimeter 32 of the collector 11 if possible.

Figures 4, 5:
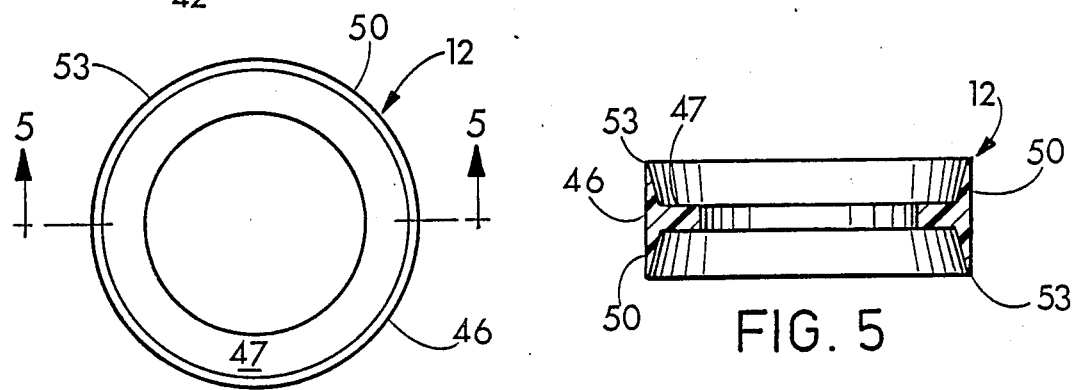
FIG. 4 is a top plan view of the directional flow control element used in the pressurized axial flow filter apparatus of FIG. 1.
FIG. 5 is a cross-section view taken along section line 5—5 of FIG. 4.

The directional flow control element 12 of the first preferred filter apparatus 10 is shown in FIGS. 4 and 5. This directional flow control element 12 is utilized in a filter apparatus when there are at least two pairs of opposed filter elements 15 enclosed in the filter container 16. The directional flow control element 12 is an annulus 46 which includes a central structural portion 47 which is disposed between the two pairs of opposed filter elements 15 and encircles the centrally located flow path 20 as shown in FIG. 1. The directional flow control element 12 further includes two projecting portions 50 which each project axially outwardly from the central structural portion 47 into an adjacent intake end 56 of a filter element 15. Each projecting portion 50 is inserted between layers of filtered tissue 36 which are disposed outwardly a few layers of tissue 36 from the filter element inner core 19 which is adjacent the centrally located flow path 20. Each projecting portion 50 thereby forms a third seal 52 with the corresponding filter element 15 to prevent leakage of unfiltered fluid into the centrally located flow path 20. The third seal 52 also deters unfiltered fluid from bypassing the filter elements 15 by preventing the unfiltered fluid from traveling between the filter elements 15 and the centrally located flow path 20 to the receiving ports 21 of the centrally located flow path 20. Each projecting portion 50 of the directional flow control element 12 is tapered to a sharp margin 53 so that each projecting portion 50 can be pushed easily between layers of filtered tissue 36 of the adjacent filter element 15 without significantly damaging the tissue 36. Since a directional flow control element 12 has two projecting portions 50, it also has two sharp margins 53 which allow the directional flow control element 12 to be pushed into the intake ends 56 of the two adjacent filter elements 15, each filter element 15 belonging to a different pair of opposed filter elements as shown in FIG. 1.

In its operation, the first preferred filter apparatus 10 of FIG. 1 is intended to function as a device which can be used to filter fluids to a very clean state, even at large flow rates. A fluid such as engine lubricating oil enters the port 17, and then proceeds to the intake end 56 of each filter element 15. The annular ring portion 25 and the rigid outer retention ring 26 on each fluid collector 11, which respectively form the first and second seals 38 and 43, prevent leakage of this unfiltered fluid into the collectors 11. Upon entering the intake end 56 of each filter element 15, the fluid then travels axially between the layers of filtered tissue 36 toward the fluid collectors 11. On exiting the filter element exit ends 28, the fluid enters the fluid collector 11 and flows into the passageways 35 formed by the ridge ends 33 and the substantially flat portion 22 shown in FIG. 2. The passageways 35 conduct the filtered fluid to the four receiving ports 21 which are located radially inwardly from each collector 11. The receiving ports 21 allow the filtered fluid to enter the centrally located flow path 20. Often the centrally located flow path 20 includes a cardboard registering tube 57 and a steel exit tube 58 as shown in FIG. 1. Near the top of the exit tube 58 are holes 59 through which the exit tube 58 receives the filtered fluid from the registering tube 57. The filtered fluid then flows down the exit tube 58 and out through the outlet port 18.

When the unfiltered fluid enters the filter container 16, some of the fluid enters the area adjacent the direction flow control element 12 to enter the intake ends 56 of the intermediate filter elements 15. As mentioned earlier, the directional flow control element 12 shown in FIGS. 1, 4 and 5 prevents that unfiltered fluid from leaking into the centrally located flow path 20 between the two adjacent filter elements 15. Additionally, the directional flow control element 12 prevents any unfiltered oil from entering and traveling between the centrally located flow path 20 and the inner core 19 of a filter element 15 to the collector 11 and thereby bypassing the filter element 15. In this manner, the directional flow control element 12 and the fluid collectors 11 deter the unfiltered fluid from bypassing the filter elements 15 and thereby prevent any cross mixing of unfiltered and filtered fluid.

As the filter elements 15 age, they accumulate water which has been left behind by the fluid being filtered. This water retention tends to expand the filter elements 15 in a radially outward direction. The sheath 13 which surrounds each pair of opposed filter elements 15 confines this expansion of the filter elements 15 to a limit defined by the outer perimeter surface 55 of the rigid outer retention ring 26. This limitation placed on filrer element 15 expansion makes filter element 15 removal and replacement an easier task.

Figure 6:
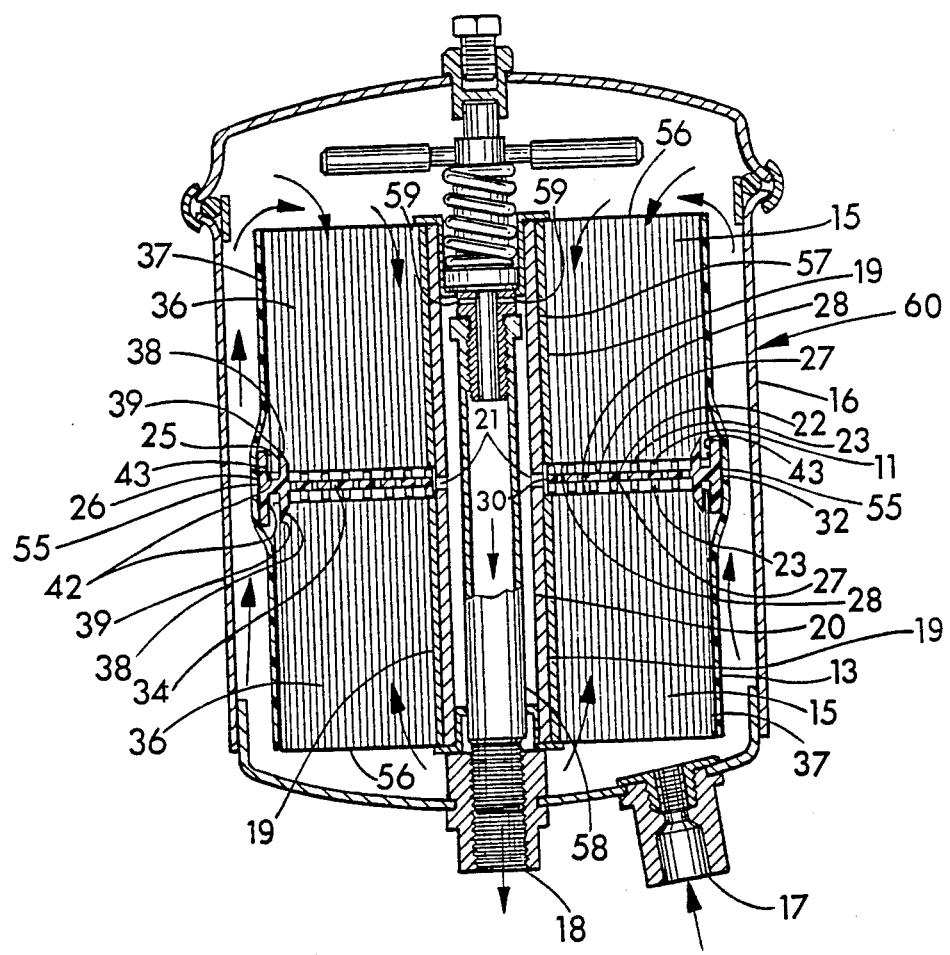
FIG. 6 is a cross-section view of a second preferred pressurized axial flow filter apparatus for filtering fluids having two opposed filter elements, a fluid collector, and one substantially non-expandable sheath.

FIG. 6 shows the second preferred pressurized axial flow apparatus 60 for filtering fluids, which has only one pair of opposed filter elements 15. Parts shown in FIG. 6 wich are substantially identical to those shown in FIG. 1, are numbered with the identical numbers used in FIG. 1. Those parts, such as the container 16 and the centrally located flow path 20, which are shortened in the second filter apparatus 60 are nevertheless considered substantially identical. The second preferred filter apparatus 60 is quite similar to the first preferred filter apparatus 10, except that its container 16 encloses only one pair of opposed filter elements 15, and therefore includes only one fluid collector 11 and sheath 13 and no directional flow control element 12.

The second preferred filter apparatus 60 of FIG. 6 operates in much the same fashion as does the first preferred filtered apparatus 10 shown in FIG. 1, except that again there is no need for a directional flow control element 12. Unfiltered fluid which enters the filter container 16 moves toward the two intake ends 56 of the filter elements 15 and then follows substantially the same course as described in reference to the first preferred filter apparatus 10.

The present invention provides a fluid filter apparatus which eliminates substantially all cross mixing of filtered and unfiltered fluid, thereby enabling the user to maintain the fluid in a very clean state. This invention is capable of producing this clean state even at a continuously large flow rate. Despite the accumulation of water in the filter elements of the apparatus, the filter elements still remain easily replaceable.

It is to be understood that the present invention is not limited to the particular arrangement and embodiments of parts disclosed and illustrated herein, nor to the material specified, but embraces all such modified forms thereof as come within the scope of the following claims.

What is claimed is:

1. A pressurized axial flow filter apparatus for filtering fluids comprising:
    (a) a container with an inlet and an outlet port;
    (b) a centrally located flow path having at least one receiving port for receiving filtered fluid which is to be transported out of the container outlet port;
    (c) at least one filter element which encircles the centrally located flow path, each filter element including wound layers of tissue through which the fluid passes, and a periphery; and
    (d) at least one fluid collector which encircles the centrally located flow path adjacent the receiving ports and which directs filtered fluid from the adjacent filter elements inwardly to the receiving ports, the fluid collector including:
        (i) a substantially flat portion having two sides of which at least one faces a filter element end from which filtered fluid is received, an inner margin which defines a centrally disposed opening through which the centrally located flow path axially passes, and an outer perimeter;
        (ii) an annular ring portion which projects axially from each side of the substantially flat portion which faces a filter element exit end, each annular ring portion extending into the adjacent filter element end between those layers of tissue which are disposed inwardly a few layers from the filter element periphery, so that the first seal is formed by each annular ring portion with the adjacent filter element end, the first seal separating the filtered fluid from any unfiltered fluid; and
        (iii) a rigid outer retention ring which projects axially from the outer perimeter of the substantially flat portion on each side which faces a filter element exit end, the rigid outer retention ring including one inside surface for each adjacent filter element, each inside surface abutting against the outer periphery of the adjacent filter element so that a second seal is formed which provides for further separation of the filtered fluid from the unfiltered fluid.

2. The pressurized axial flow filter apparatus specified in claim 1 wherein the fluid collector further includes upraised ridges which project axially from each side of the substantially flat portion which faces a filter element exit end to abut and hold the corresponding filter elements in spaced relation to the flat portion, the upraised ridges having ridge ends which with the substantially flat portion define passageways for filtered fluid to flow from the adjacent filter element ends to the receiving ports; and wherein each annular ring portion projects axially a greater distance than do the upraised ridges.

3. The pressurized axial flow filter apparatus specified in claim 2 wherein the upraised ridges are substantially concentric.

4. The pressurized axial flow filter apparatus specified in claim 1 wherein the annular ring portions of each collector are each tapered to a sharp edge where each extends into a filter element end, so that each annular ring portion is pushed easily between the layers of filter tissue of the adjacent filter element exit ends.

5. The pressurized axial flow filter apparatus specified in claim 2 including at least one pair of opposed filter elements, and wherein a fluid collector is located between the two opposed filter elements so that each side of the substantially flat portion faces a filter element end from which filtered fluid is received.

6. The pressurized axial flow fluid filter apparatus specified in claim 5 wherein the substantially flat portion of the fluid collector has a plurality of holes therethrough between the two sides to equalize fluid pressure on both sides of the substantially flat portion, the holes being spaced along the substantially flat portion where the substantially flat portion and the ridge ends define the passageways.

7. The pressurized axial flow fluid filter apparatus specified in claim 5 wherein there are at least two pairs of opposed filter elements, and wherein the pressurized axial flow fluid filter apparatus further includes a directional flow control element comprising an annulus including a central structural portion which is disposed between pairs of opposed filter elements and encircles the centrally located flow path, and two projecting portions which each project axially outwardly from the central structural portion into an adjacent end of a filter element between layers of filter tissue which are disposed outwardly a few layers of tissue from a filter element inner core which is adjacent the centrally located flow path, each projecting portion forming a third seal with the corresponding filter element to prevent leakage of unfiltered fluid into the centrally located flow path and also to prevent leakage between the filter element and the centrally located flow path.

8. The pressurized axial flow fluid filter apparatus specified in claim 7 wherein each projecting portion of the directional flow control element is tapered to a sharp margin so that each projecting portion may be pushed easily between the layers of filter tissue of the adjacent filter element.

9. The pressurized axial flow fluid filter apparatus specified in claim 1 further comprising at least one substantially non-expandable sheath, each of which surrounds and abuts an outer perimeter surface of the rigid outer retention ring of one collector and also the peripheries of the adjacent filter elements to limit expansion of the filter elements due to adsorption of water to an outer limit approximately defined by the outer perimeter surface of the rigid outer retention ring, so that the filter elements are prevented from expanding to a point where they would abut against the container.

10. The pressurized axial flow fluid filter apparatus specified in claim 9 wherein the sheath is formed from a substantially rectangular, shrink-wrappable, heat-sealed plastic sheet which is dimensionally stable at the operating temperatures of the filter apparatus, the piece of plastic being joined at two ends to form a seam.

11. The pressurized axial flow fluid filter apparatus specified in claim 10 wherein the sheath is formed from polyethylene terephthalate.

12. The pressurized axial flow fluid filter apparatus specified in claim 7 further comprising at least one substantially non-expandable sheath, each of which surrounds and abuts an outer perimeter surface of the rigid outer retention ring of one collector and also the peripheries of the adjacent filter elements to limit expansion of the filter elements due to adsorption of water to an outer limit defined by an outer perimeter surface of the rigid outer retention ring, so that the filter elements are prevented from expanding to a point where they would abut against the container.

13. A pressurized axial flow filer apparatus for filtering fluids comprising:
 (a) a container with an inlet and an outlet port;
 (b) a centrally located flow path having at least one receiving port for receiving filtered fluid to be transported out the container outlet port;
 (c) at least two pairs of opposed filter elements, each filter element encircling the centrally located flow path and including wound layers of tissue through which the fluid passes, and a periphery;
 (d) at least two fluid collectors, each collector encircling the centrally located flow path adjacent the receiving ports between the filter elements of each pair of opposed filter elements, each collector having at least one passageway for filtered fluid to flow from the opposed filter elements to the receiving ports; and
 (e) a directional flow control element comprising an annulus including a central structural portion which is disposed between pairs of opposed filter elements and entrained about the centrally located flow path, and two projecting portions which each project axially outwardly from the central structural portion into an adjacent end of a filter element between layers of filter tissue which are disposed outwardly a few layers of tissue from a filter element inner core which is adjacent the centrally located flow path, each projecting portion forming a seal with the corresponding filter element to prevent leakage of unfiltered fluid into the centrally located flow path and also to prevent leakage between the filter element and the centrally located flow path.

14. The pressurized axial flow fluid filter apparatus specified in claim 13 wherein each projecting portion of the directional flow control element is tapered to a sharp margin so that each projecting portion may be pushed easily between the layers of filter tissue of the adjacent filter element.

15. The pressurized axial flow fluid filter apparatus specified in claim 13 further comprising at least one substantially non-expandable sheath, each of which surrounds one collector and also surrounds and abuts the peripheries of the adjacent filter elements to limit expansion of the filter elements due to adsorption of water, so that the filter elements are prevented from expanding to a point where they would abut against the container.

16. The pressurized axial flow fluid filter apparatus specified in claim 15 wherein the sheath is formed from a substantially rectangular, shrink-wrappable, heat-sealed plastic sheet which is dimensionally stable at the operating temperatures of the filter apparatus, the piece of plastic being joined at two ends to form a seam.

17. The pressurized axial flow fluid filter apparatus specified in claim 16 wherein the sheath is formed from polyethylene terephthalate.

18. A pressurized axial flow filter apparatus for filtering fluids comprising:
(a) a container with an inlet and an outlet port;
(b) a centrally located flow path having at least one receiving port for receiving filtered fluid which is to be transported out of the container outlet port;
(c) at least one filter element which encircles the centrally located flow path, each filter element including wound layers of tissue through which the fluid passes, and a periphery;
(d) at least one fluid collector which encircles the centrally located flow path adjacent the receiving ports and has at least one passageway for filtered fluid to flow from adjacent filter elements inwardly to the receiving ports;
(e) at least one substantially non-expandable sheath, each of which surrounds one collector and also surrounds and abuts the peripheries of the adjacent filter elements to limit expansion of those filter elements due to adsorption of water, so that the filter elements are prevented from expanding to a point where they would abut against the container.

19. The pressurized axial flow fluid filter apparatus specified in claim 18 wherein the sheath is formed from a substantially rectangular, shrink-wrappable, heat-sealed plastic sheet which is dimensionally stable at the operating temperatures of the filter apparatus, the piece of plastic being joined at two ends to form a seam.

20. The pressurized axial flow fluid filter specified in claim 19 wherein the sheath is formed from polyethylene terephthalate.

21. A fluid collector which is adapted to transport filtered fluid within an axial flow filter apparatus from at least one filter element having wound layers of tissue to at least one receiving port into a centrally located flow path to a filter apparatus container outlet port, the fluid collector comprising:
(a) a substantially flat portion having
(i) two sides, at least one of which is adapted to face a filter element end from which filtered fluid is received;
(ii) an inner margin which defines a centrally disposed opening adapted to allow the centrally located flow path to pass axially therethrough; and
(iii) an outer perimeter;
(b) an annular ring portion which projects axially from each side of the substantially flat portion which is adapted to face a filter element exit end, each annular ring portion being adapted to extend into the adjacent filter exit end between those layers of tissue which are disposed inwardly a few layers of tissue from a filter element periphery, so that a first seal is formed by each annular ring portion with the adjacent filter element end, the first seal separating filtered fluid from any unfiltered fluid; and
(c) a rigid outer retention ring which projects axially from the outer perimeter of the substantially flat portion on each side which is adapted to face a filter element exit end, the rigid outer retension ring including one side surface for each adjacent filter element, each inside surface adapted to abut against the outer periphery of the adjacent filter element so that a second seal is formed which provides for further separation of the filtered fluid from the unfiltered fluid.

22. The fluid collector specified in claim 21 wherein the fluid collector includes upraised ridges which project axially from each side of the substantially flat portion which is adapted to face a filter element exit end to abut and hold the corresponding filter element ends in spaced relation to the flat portion, the upraised ridges having ridge ends which with the substantially flat portion define passageways for filtered fluid to flow from the adjacent filter element ends to the receiving ports; and wherein each annular ring portion projects axially a greater distance than do the upraised ridges.

23. The fluid collector specified in claim 22 wherein the upraised ridges are substantially concentric.

24. The fluid collector specified in claim 21 wherein the annular ring portions are each tapered to a sharp edge where each is adapted to extend into a filter element end, so that each annular ring portion can be pushed easily between the layers of filter tissue of the adjacent filter element exit ends.

25. The fluid collector specified in claim 22 wherein the fluid collector is adapted to be located between two opposed filter elements so that each side of the substantially flat portion is adapted to face a filter element end from which filtered fluid is received.

26. The fluid collector specified in claim 25 wherein the substantially flat portion of the fluid collector has a plurality of holes therethrough between the two sides, the holes being adapted to equalize fluid pressure on both sides of the substantially flat portion.

27. A directionaly flow control element which is adapted to encircle a centrally located flow path in a pressurized axial flow filter apparatus, the directional flow control element comprising an annulus which includes:
(a) a central structural portion which is adapted to be disposed between different pairs of opposed spaced filter elements and to encircle the centrally located flow path; and
(b) two projecting portions which project axially outwardly in opposed directions from the central structural portion and are each adapted to extend into an adjacent end of the filter element between layers of filter tissue which are disposed outwardly from a few layers of tissue from a filter element inner core which is adjacent the centrally located flow path, each projecting portion forming a seal with the corresponding filter element to prevent leakage of unfiltered fluid into the centrally located flow path and also to prevent leakage between the filter element and the centrally located flow path.

28. The directional flow control element specified in claim 27 wherein each projecting portion of the directional flow control element is tapered to a sharp margin so that each projecting portion may be pushed easily between the layers of filter tissue of the adjacent filter element.

* * * * *